(12) United States Patent
Yazdy et al.

(10) Patent No.: US 7,286,527 B2
(45) Date of Patent: Oct. 23, 2007

(54) METHOD AND APPARATUS FOR ROUND TRIP DELAY MEASUREMENT IN A BI-DIRECTIONAL, POINT-TO-POINT, SERIAL DATA CHANNEL

(75) Inventors: Farid A. Yazdy, Belmont, CA (US); Kreg A. Martin, Los Gatos, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 1090 days.

(21) Appl. No.: 10/205,793

(22) Filed: Jul. 26, 2002

(65) Prior Publication Data

US 2004/0017806 A1    Jan. 29, 2004

(51) Int. Cl.
*H04L 12/28* (2006.01)
*H04L 12/56* (2006.01)

(52) U.S. Cl. .................... 370/389; 370/252
(58) Field of Classification Search ............ None
See application file for complete search history.

(56) References Cited

U.S. PATENT DOCUMENTS

| | | | |
|---|---|---|---|
| 5,959,568 A * | 9/1999 | Woolley | 342/42 |
| 6,751,198 B1 * | 6/2004 | McPherson et al. | 370/252 |
| 6,952,419 B1 * | 10/2005 | Cassiday et al. | 370/392 |
| 2002/0120727 A1 * | 8/2002 | Curley et al. | 709/223 |
| 2003/0048754 A1 * | 3/2003 | Bruckman | 370/252 |

OTHER PUBLICATIONS

ANSI X3.272-1996 Fibre Channel—Arbitrated Loop (FC-AL) pp. 14-18 (FC-AL Primitive Signals and Sequences).
Fibre Channel—Physical and Signaling Interface (FC-PH) Rev 4.3 working draft Jun. 1, 1994; Ordered sets pp. 81-89; Table 25 Primitive Signals p. 71; Table 26 Primitive Sequences p. 71; Table 27 Primitive Sequence Summary p. 87.

* cited by examiner

*Primary Examiner*—Brian Nguyen
(74) *Attorney, Agent, or Firm*—Wong, Cabello, Lutsch, Rutherford, & Brucculeri, LLP (57) ABSTRACT

The link round trip delay between two switches in a Fibre Channel network may be determined by sending a particular timing signal value from an originating switch to a responding switch. The responding switch may store the timing signal value in an "echo" register for comparison to subsequently received timing signals. The originating switch may then send the pre-selected timing signal to the responding switch while simultaneously starting a timer. When the responding switch receives the timing signal, it may compare the value of the received signal to that stored in its echo register. If the value, is the same, the responding switch may retransmit—i.e., echo—the timing signal to the originating switch. When the originating switch receives the echoed timing signal, it may stop its timer and compute the link round trip delay time. The computed link round trip delay time between the originating switch and the responding switch may be advantageously used in fabric routing algorithms.

37 Claims, 5 Drawing Sheets

METHOD AND APPARATUS FOR ROUND TRIP DELAY MEASUREMENT IN A BI-DIRECTIONAL, POINT-TO-POINT, SERIAL DATA CHANNEL

BACKGROUND OF THE INVENTION

1. Field of the Invention

The invention relates generally to data transmission in a Fibre Channel network and more particularly, but not by way of limitation, to techniques for measuring the time required to send data over a particular high-speed link.

2. Description of the Related Art

As used herein, the term "Fibre Channel" refers to the Fibre Channel family of standards promulgated by the American National Standards Institute as ANSI X.3/T11. In general, Fibre Channel defines a high-speed serial transport system that uses a hierarchically structured information exchange protocol consisting of frames, sequences and exchanges. A "frame" is the atomic unit of data transmission between two communicating devices. A "sequence" is a set of one or more related data frames transmitted unidirectionally from one device to another device within an exchange. An "exchange" is the basic construct for coordinating the transfer of information between communicating devices during higher layer protocol operations such as Small Computer System Interface (SCSI) and Transport Control Protocol/Internet Protocol (TCP/IP).

Figure 1:
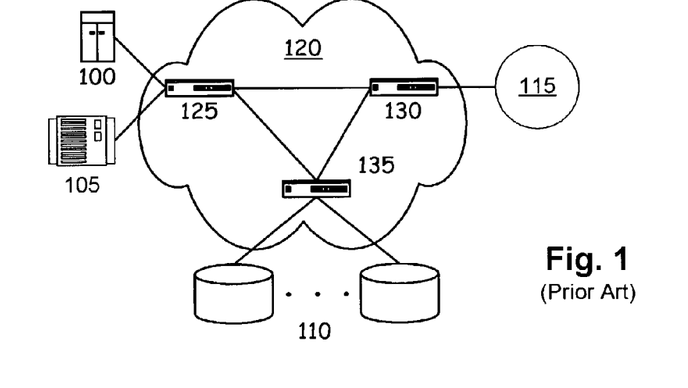
FIG. 1 is a block diagram of an illustrative prior art Fibre Channel network.

Referring to FIG. 1, communication between end devices or nodes such as server 100, storage unit 105, databases 110 and loop 115 (itself comprised of devices, not shown) is mediated by "fabric" 120, a term which refers to one or more operatively coupled Fibre Channel switches, e.g., 125, 130 and 135.

Fibre Channel defines three topologies, namely Point-to-Point, Arbitrated Loop, and Fabric. A Point-to-Point topology is the simplest of the three. It consists of two and only two Fibre channel devices connected directly together. The transmit fibre of one device goes to the receive fibre of the other device, and vice versa. There is no sharing of the media, which allows the devices to enjoy the total bandwidth of the link. A simple link initialization is required of the two devices before communication can begin. The Fabric topology is used to connect many (up to $2^{24}$) devices in a switched configuration. The benefit of this topology is that many devices can communicate at the same time; the media is not shared. It requires the use of one or more switches which dynamically route data between devices by establishing links between nodes. Routing algorithms typically require information concerning the round trip delay of switch-toswitch links. Measuring the round trip delay of switch-to-switch links also enables link-to-link skew calculations for trunking. A prior art method of measuring the round trip delay of a switch-to-switch link is illustrated in FIG. 2 in block diagram form.

The round trip delay is measured by transmitting a particular Primitive Signal. A Primitive Signal is an Ordered Set used to indicate an event. An Ordered Set is a 4-byte Transmission Word which has the Special Character as its first Transmission Character. An Ordered Set may be a Frame Delimited, a Primitive Signal, or a Primitive Sequence. Ordered Sets are used to distinguish Fibre Channel control information from data. A Transmission Word is a string of four consecutive Transmission Characters—a (valid or invalid) 10-bit character transmitted serially over the fibre. Valid Transmission Characters are determined by the 8B/10B encoding specification. The Special Character is a special 10-bit Transmission Character which does not have a corresponding 8-bit value, but is still considered valid. The Special Character is used to indicate that a particular Transmission Word is an Ordered Set. The Special Character is the only Transmission Character to have five 1's or 0's in a row. The Special Character is also referred to as K28.5 when using K/D format. For additional explanation of these various terms, one may refer to the Fibre Channel standards, particularly FC-PH, which is ANSI publication X3.230, and is hereby incorporated by reference.

In one particular method employed by the prior art, the MARK (or MRK) primitive signal is used as the transmitted ordered set. This Primitive Signal nominally applies only to the Arbitrated Loop topology and in that use is defined in the FC-AL specification ANSI X3.272-1996, which is hereby incorporated by reference. It is intended to be transmitted by an L Port for synchronization purposes and its use is vendor specific. It may be appropriated for use in point-to-point timing measurements.

Figure 2A:
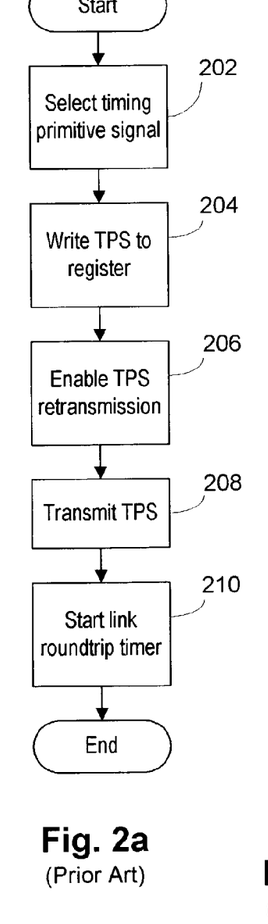
FIGS. 2a, 2b and 2c are flow charts of a prior art process for measuring the link round trip delay between two Fibre Channel switches connected by a bi-directional point-to-point serial data channel.
Figure 2B:
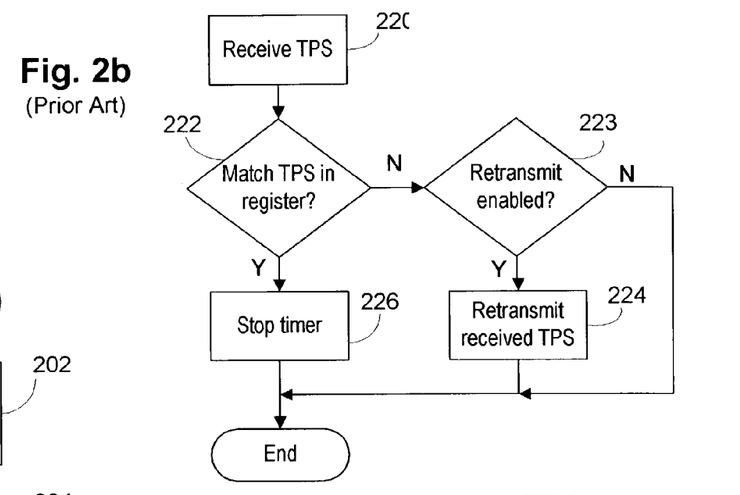
Figure 2C:
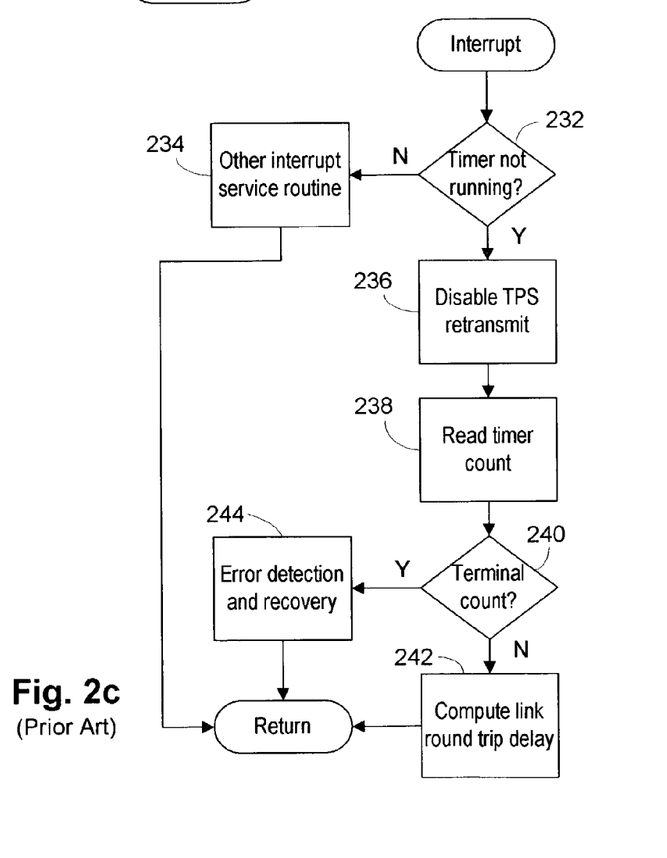

As shown at Block 202 in FIG. 2a, a unique Timing Primitive Signal (TPS) is selected and written to a register (Block 204). In order for the link round trip measurement to be performed, a switch must retransmit TPS's other than those it originates. To allow this to happen, TPS retransmission must be enabled in the responding switch while this procedure is taking place [Block 206]. The TPS is transmitted to the remote switch [Block 208] and the Link Round Trip Timer is simultaneously started [Block 210].

The process shown in FIG. 2b may be implemented in hardware logic circuits. The Link Round Trip Timer will run until a TPS is received [Block 220] that matches the contents of the TPS stored in the register [Block 222] at which point it will stop [Block 226], optionally generating an interrupt. At this point, the value in the Link Round Trip Timer register will contain a number corresponding to the link round trip delay between adjacent switches. If the TPS received does not match the contents of the TPS value register [the N branch of Diamond 222] and the retransmission function is enabled [the Y branch of Diamond 223], the TPS received is retransmitted [Block 224] inasmuch as the switch at the other end of the inter-switch link may be simultaneously performing a link round trip measurement.

In one particular embodiment, each count in the Link Round Trip Timer represents one cycle of a 106.25 MHz clock. If the Link Round Trip Timer Register comprises 19 bits, it follows that this counter can measure the link round trip delay in cables of nearly 2000 kilometers using a typical propagation delay of 500 microseconds for a 200-kilometer fiber optic cable.

In the illustrated embodiment of the prior art, the timer will also stop, generating a "timer not running" interrupt, if the original TPS is not received before the Link Round Trip Timer reaches terminal count. Thus, a "timer not running" interrupt with a terminal count in the timer register may be used as an indication of a lost TPS for error detection and recovery, if desired. An implementation of this process is illustrated in block form in FIG. 2c where a "timer not running interrupt" is detected [the Y branch of Diamond 232], the timer register read [Block 238] and if a terminal count is found [Y branch of Diamond 240], error detection and recovery routines are initiated [Block 244].

A successful link round trip timing measurement will produce less than terminal count in the Link Round Trip Timer Register [the N branch of Diamond 240] and the link round trip delay may be computed from the count in the Link Round Trip Timer Register and the clock rate [Block 242]. To prevent endless recycling of unwanted TPS's, retransmission of TPS's should be disabled [Block 236] unless a link round trip measurement is being performed.

One disadvantage of this prior art method is that in order for the link round trip measurement to be performed, each switch must retransmit any TPS that it did not originate. Thus, an orphan TPS—i.e., a TPS which (due perhaps to data corruption) does not match the value stored in the register of an originating switch will be endlessly recycled until TPS retransmission is disabled if both switches are attempting to perform link round trip timing, such as may occur during link startup. Such unwanted recycling consumes valuable bandwidth in the communications system. The present invention solves this problem.

SUMMARY OF THE INVENTION

Prior to initiating a link round trip delay measurement, the originating Fibre Channel switch sends the value of the particular timing primitive signal selected for use to the remote switch with instructions to store that timing primitive signal value in the "echo" register of the remote switch. When the echo function is enabled in the remote switch, only a received timing primitive signal that matches the contents of the echo register is retransmitted to the originating switch.

DETAILED DESCRIPTION

Figures 3A, 3B:
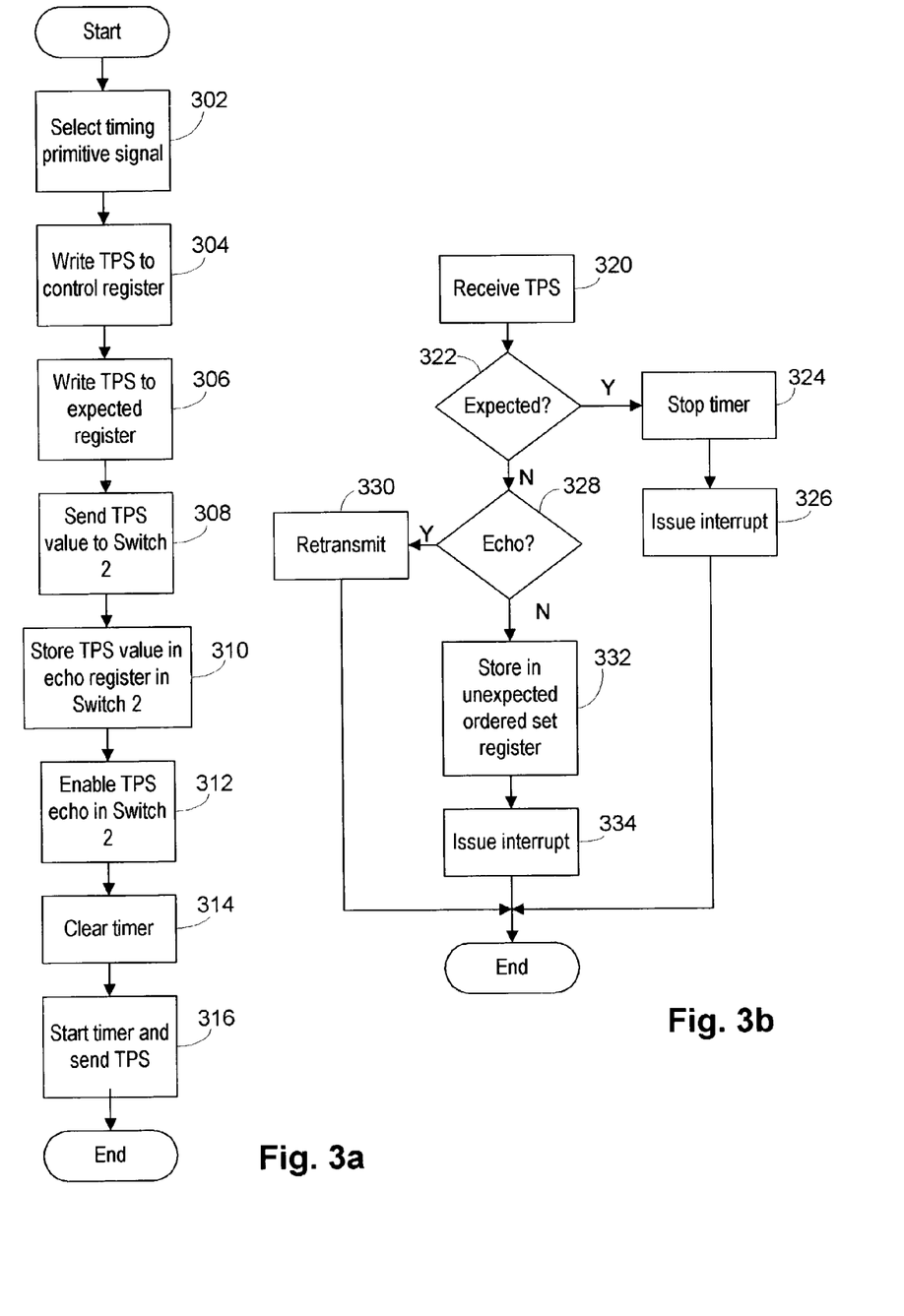
FIGS. 3a, 3b and 3c are flow charts of one embodiment of the process of the present invention for measuring link round trip delay times.
Figure 3C:
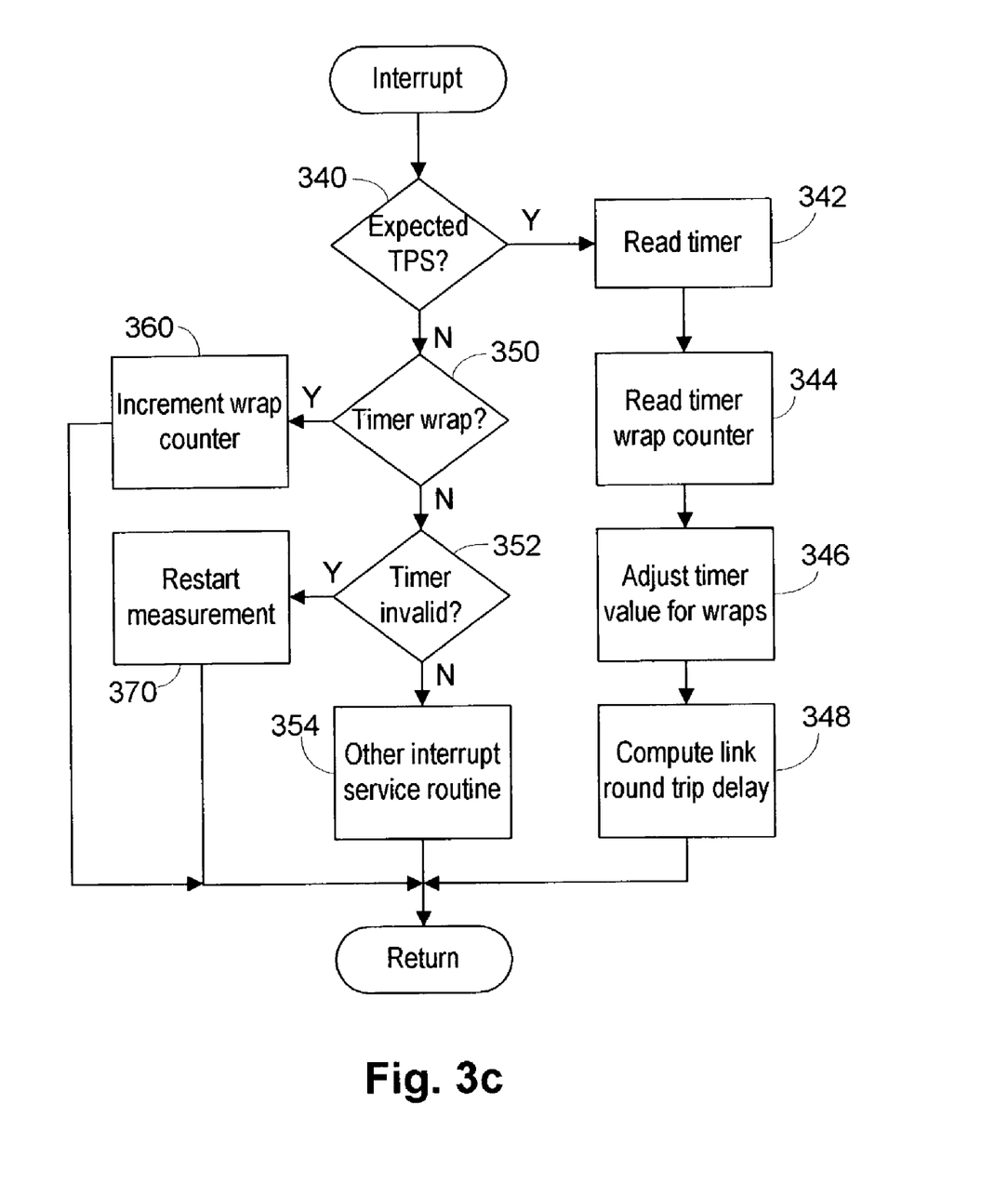

One example of a process which embodies the present invention is shown in flow chart form in FIGS. 3a, 3b and 3c. In Block 302 of FIG. 3a, a unique timing primitive signal may be selected by the originating switch ("Switch 1"). This particular timing primitive signal is then written to the control register of Switch 1 [Block 304] and the "expected register" of Switch 1 [Block 306]. The originating switch may send the value of the selected timing primitive signal to the responding switch ("Switch 2") at the other end of the link [Block 308]. The timing signal primitive value may be contained in the payload of a frame sent by Switch 1 to Switch 2. A frame is a data unit containing a start-of-frame (SOF) delimiter, a header, the payload, a cyclic redundancy check value (for error detection and correction) and an end-of-frame (EOF) delimiter.

In one particular embodiment, Switch 2 stores the value of the timing primitive signal in an "echo register" within Switch 2 [Block 310] for comparison to timing primitive signals subsequently received by Switch 2.

The echo function may be enabled in the responding switch (Switch 2) by the sending of an appropriate signal from the originating switch (Switch 1) [Block 312].

A timer associated with the originating switch may be cleared [Block 314]. The timing primitive signal may be sent and the timer simultaneously started [Block 316]

The actions of a switch receiving a timing primitive signal in one particular embodiment are depicted in FIG. 3b beginning with the receipt of a timing primitive signal [Block 320]. The value of the received timing primitive signal is compared to the value (if any) stored in the expected register of the switch [Diamond 322]. This function is associated with the action of the switch in the role of originating switch in a link round trip delay measurement. If the expected value is received [Y branch of Diamond 322], the timing primitive signal sent by the switch has been successfully echoed by the responding switch and the timer may be stopped [Block 324] and an interrupt issued [Block 326]

If the value of the received timing primitive signal (TPS) does not match the value in the expected register [N branch of Diamond 322], the value of the TPS may be compared to the value stored in the echo register of the switch [Diamond 328]. If the value of the TPS matches that in the echo register [Y branch of Diamond 328], it is indicative of a link round trip delay measurement being conducted by an originating switch at the other end of the connecting link and the TPS may be retransmitted ("echoed") from the receiving switch [Block 330] if the echo function of the switch is enabled.

If the value of the received timing primitive signal is different from both the value in the expected register and the value in the echo register [N branch of Diamond 328], the received TPS value may be stored in an "unexpected ordered set register" and an interrupt may be issued [Block 334] to initiate error detection and recovery. One possible scenario leading to the event depicted in Block 332 is the corruption of a timing primitive signal during transmission.

The actions of a processor-based system which may comprise a switch in a Fibre Channel network in response to an interrupt signal are shown in FIG. 3c.

If the value of a received timing primitive signal matches the contents of the "expected register" [Y branch of Diamond 340], it is indicative of a timing primitive signal being echoed by a remote switch (the responding switch or "Switch 2"). In one particular embodiment, the timer will have been stopped by the logic circuitry upon receipt of a TPS that matches the value stored in the expected register of the switch [Block 324 of FIG. 3b]. Accordingly, the timer may be read [Block 342] to determine the number of clock cycles since the timer was started (or since the timer counter rolled over).

In one embodiment, the timer counter register is a binary counter having a finite number of bits. If the timer count exceeds the maximum value that the register can hold, the register "wraps"—i.e., increments to zero—and an interrupt signal may be generated. If a timer wrap occurs [Y branch of Diamond 350], a counter may be incremented [Block 360] so as to increase the effective capacity of the timer register. In such an embodiment, the wrap counter must also be read [Block 344] and the value of the timer register adjusted for the number of times the timer counter has wrapped [Block 346] before computing the link round trip delay [Block 348].

In one embodiment, a "link round trip timer invalid" interrupt request [Block 352] indicates that an End of Frame delimiter has been detected by the receiving logic circuitry before the expected timing primitive signal. This is an indication that the link round trip delay measurement is possibly inaccurate due to an interruption caused by a frame transmission in the middle of TPS echoing on the other side of the link [Y branch of Diamond 352]. In this situation, it may be desirous to restart the link round trip delay measurement [Block 370].

It will be appreciated by those skilled in the art that the above-disclosed process obviates the problem of unwanted timing primitive signals being endlessly echoed between switches inasmuch as only a timing primitive signal which matches the value stored in the expected register of the receiving switch will be echoed to the originating switch.

Figure 4:
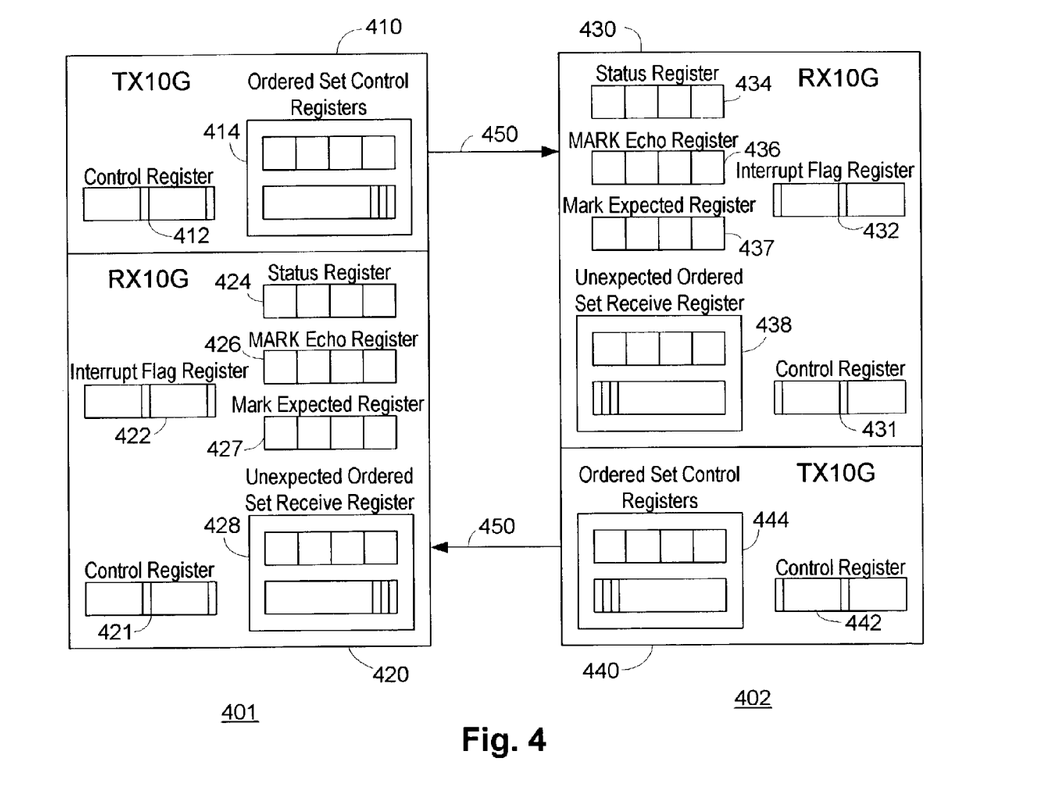
FIG. 4 is a block diagram of two Fibre Channel switches connected by a Fibre Channel link.

One particular hardware embodiment of the present invention is shown in block diagram form in FIG. 4 wherein 401 and 402 are 10GFC ports (Fibre Channel expansion ports connecting two switches using a 10GFC link) of two Fibre Channel switches connected in a point-to-point topology. Switches are fabric devices providing full bandwidth per port and high-speed routing of data via link-level addressing. Arrows 450 denote an Interswitch Link—a bi-directional point-to-point serial data channel connection between two switches using the 10GFC ports.

Transmitters 410 and 440 comprise control registers 412 and 442, respectively and ordered set control registers 414 and 444, respectively.

Receivers 420 and 430 comprise control registers 421 and 431, respectively; status registers 424 and 434, respectively; interrupt flag registers 422 and 432, respectively; echo registers 426 and 436, respectively, expected registers 427 and 437, respectively; and, unexpected ordered set receive registers 428 and 438, respectively.

In the particular embodiment shown in FIG. 4, the timing primitive signal to be transmitted is loaded into the ordered set control register 9414 and/or 444) of the originating switch and the TPS is transmitted and the link round trip timer is started by setting appropriate bits in the control register (412 and/or 442).

A particular bit in the control register in the receiver logic (421 and/or 431) may be used to indicate that TPS retransmission has been enabled. TPS values to be echoed may be stored in an echo register (426 and/or 436) while TPS values sent by an originating switch may be stored in the expected register (427 and/or 437) of the originating switch. Unexpected timing primitive signals may be stored in the unexpected ordered set receive register (428 and/or 438) of a responding switch and an appropriate interrupt flag written to the associated interrupt flag register (422 and/or 432). In one embodiment, the receipt of a TPS matching the contents of the expected register will also cause the generation of an interrupt and a corresponding flag may be stored in the associated interrupt flag register (422 or 432). Determination of the interrupt source can be made by referencing the status register (424 and/or 434).

Figure 5:
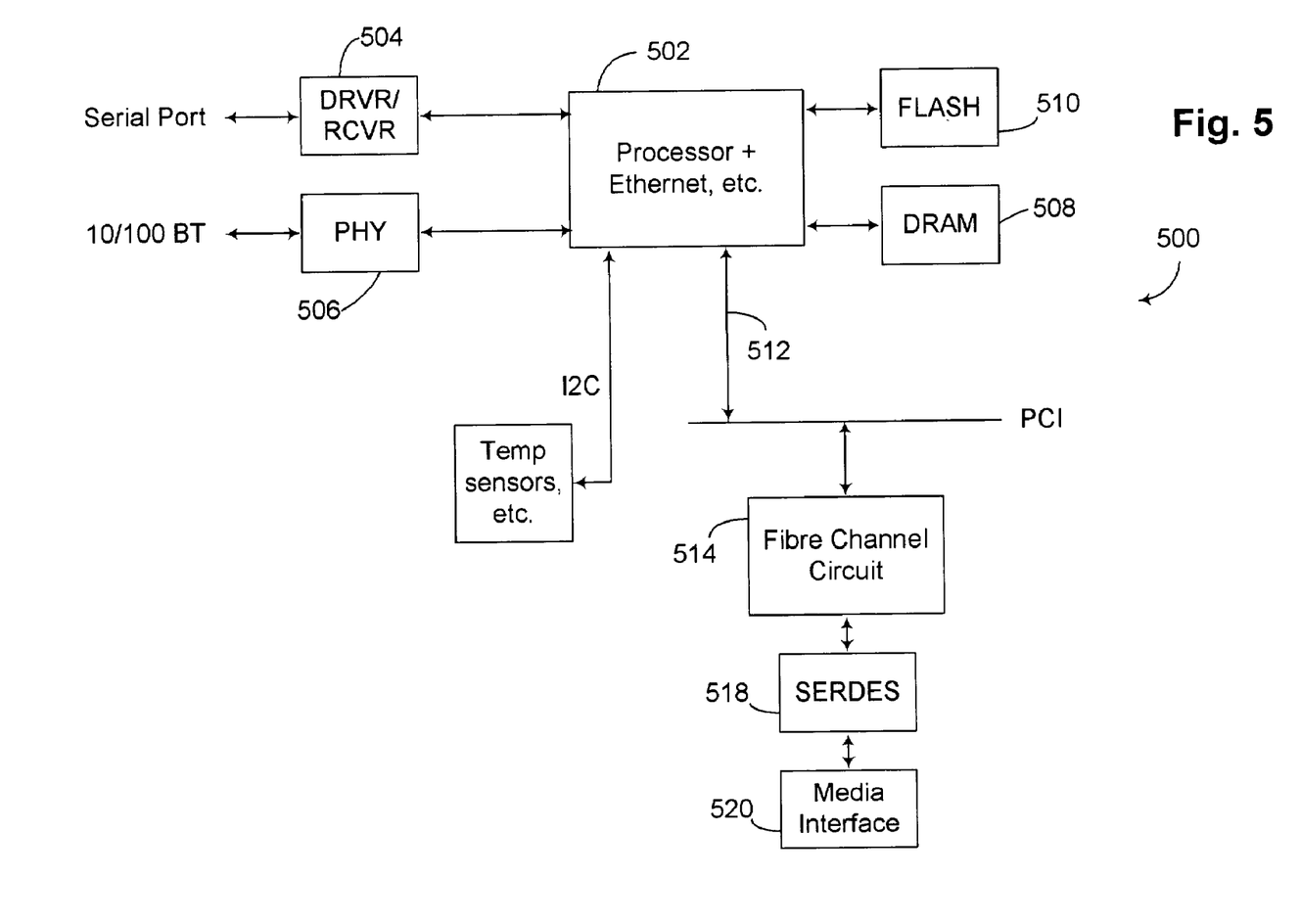
FIG. 5 is a block diagram of a processor-based system which may embody the present invention.

A processor-based system which may embody the present invention is shown in block diagram form in FIG. 5 wherein processor and I/O interface complex 502 provides the processing capabilities of the processor-based system 500. The processor may be any of various suitable processors, including the Intel i960 and the Motorola PowerPC. The I/O interfaces may include low speed serial interfaces, such as RS-232, which use a driver/receiver circuit 504, or high-speed serial network interfaces, such as Ethernet, which use a PHY circuit 506 to connect to a local area network (LAN). Main memory or DRAM 508 and flash or permanent memory 510, are connected to the processor complex 502 to provide memory to control and be used by the processor.

The processor complex 502 also includes an I/O bus interface 512, such as a PCI bus, to connect to Fibre Channel circuit 514. The Fibre Channel circuit 514 contains the Fibre Channel ports which perform the link round trip delay measurement. Each port is connected to an external SERDES circuit 518, which in turn is connected to a media interface 520, which receives the particular medium used to interconnect switches used to form a fabric or to connect to various devices or nodes.

Those skilled in the art will appreciate that link round trip delay measurements may be conducted simultaneously by each switch connected by an interswitch link.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A transceiver comprising:
a receiver for receiving timing signals from a remote transceiver;
a first register for storing timing signal values received from said remote transceiver;
logic circuitry for comparing the value of a timing signal received from said remote transceiver to a timing signal value stored in said first register for storing timing signal values; and,
a transmitter for transmitting a timing signal received from said remote transceiver, when the value of the timing signal is the same as the timing signal value stored in said first register.

2. A transceiver as recited in claim 1 wherein the timing signal is a primitive.

3. A transceiver comprising:
a transmitter for sending a timing signal value to a remote transceiver for storage in said remote transceiver;
a register for storing the timing signal value;
a transmitter for transmitting a timing signal to said remote transceiver;
a timer which starts when said transmitter transmits the timing signal and which can be stopped;
a receiver for receiving timing signals from said remote transceiver; and,
a comparator coupled to said receiver and said timer for stopping said timer if the value of a received timing signal is the same as the timing signal value stored in said register.

4. A transceiver as recited in claim 3 wherein the timing signal is a primitive.

5. A transceiver as recited in claim 3 further comprising:
a receiver for receiving a timing signal value from said remote transceiver;
a register for storing said received timing signal value;
a transmitter for transmitting received timing signals to said remote transceiver;
a comparator coupled to said receiver for receiving a timing signal value and said transmitter for transmitting received timing signals for transmitting a received timing signal if the value of the received timing signal is the same as the received timing signal value stored in said register.

6. A Fibre Channel switch comprising:
a receiver for receiving timing primitive signals from a remote Fibre Channel switch;
a first register for storing timing primitive signal values received from said remote Fibre Channel switch;
logic circuitry for comparing the value of a timing primitive signal received from said remote Fibre Channel switch to a timing signal value stored in said first register for storing timing primitive signal values; and, a transmitter for transmitting a timing primitive signal received from said remote Fibre Channel switch, when the value of the timing primitive signal is the same as the timing primitive signal value stored in said first register.

7. A Fibre Channel switch as recited in claim 6 further comprising a second register for storing timing primitive signal values received from said remote Fibre Channel switch which are not the same as the timing primitive signal values stored in said first register.

8. A Fibre Channel switch as recited in claim 7 further comprising logic circuitry for issuing an interrupt when a timing primitive signal value is stored in said second register.

9. A Fibre Channel switch comprising:
a transmitter for sending a timing primitive signal value to a remote Fibre Channel switch for storage in said remote Fibre Channel switch;
a register for storing the timing primitive signal value;
a transmitter for transmitting a timing primitive signal to said remote Fibre Channel switch;
a timer which starts when said transmitter transmits the timing primitive signal and which can be stopped;
a receiver for receiving timing primitive signals from said remote Fibre Channel switch; and,
a comparator coupled to said receiver and said timer for stopping said timer if the value of a received timing primitive signal is the same as the timing primitive signal value stored in said register.

10. A Fibre Channel switch as recited in claim 9 further comprising:
a receiver for receiving a timing primitive signal value from said remote Fibre Channel switch;
a register for storing said received timing primitive signal value;
a transmitter for transmitting received timing primitive signals to said remote Fibre Channel switch;
a comparator coupled to said receiver for receiving a timing primitive signal value and said transmitter for transmitting received timing primitive signals for transmitting a received timing primitive signal if the value of the received timing primitive signal is the same as the received timing primitive signal value stored in said register.

11. A method for measuring a link round trip delay between two Fibre Channel switches comprising:
selecting a timing primitive signal value;
storing the selected timing primitive signal value in a first register in a first switch;
sending the selected timing primitive signal value to a second switch;
storing the selected timing primitive signal value in a second register in said second switch;
transmitting a timing primitive signal having the selected value from said first switch to said second switch;
starting a timer when the said timing primitive signal is transmitted by said first switch;
receiving a primitive signal in said second switch;
comparing the value of the received primitive signal to the selected timing primitive signal value stored in said second register;
transmitting the received primitive signal from said second switch to said first switch if said received primitive signal value is the same as the timing primitive signal value stored in said second register;
receiving said primitive signal transmitted by said second switch in said first switch;
comparing the value of said received primitive signal transmitted by said second switch to the selected timing primitive signal value in said first register; and,
stopping the timer if said received primitive signal value transmitted by said second switch is the same as the timing primitive signal value stored in said first register.

12. A method as recited in claim 11 further comprising storing timer counts in a third register in said first switch in response to a cyclic clock signal and computing a link round trip delay time from a clock cycle rate and the number of timer counts in said third register.

13. A method as recited in claim 12 further comprising using said computed link round trip delay time in a routing algorithm for a Fibre Channel fabric.

14. A method as recited in claim 11 further comprising stopping the timer and generating a interrupt signal if the timer count exceeds a selected value.

15. A method as recited in claim 11 further comprising storing clock counts in a register which rolls over when its maximum value is exceeded and incrementing a counter each time said rollover occurs.

16. A method as recited in claim 11 further comprising enabling retransmission of selected timing primitive signals in said second switch prior to transmitting said timing primitive signal from said first switch.

17. A method as recited in claim 16 further comprising disabling retransmission of selected timing primitive signals in said second switch subsequent to receiving said timing primitive signal by said first switch.

18. A method as recited in claim 11 further comprising storing a received timing primitive signal value in a third register in said second switch if said received timing primitive signal value does not match said selected timing primitive signal value stored in said second register.

19. A method as recited in claim 18 further comprising generating an interrupt signal in response to storing said received timing primitive signal value in said third register.

20. A method as recited in claim 19 further comprising initiating an error detection process in response to said interrupt signal.

21. A method as recited in claim 19 further comprising restarting said link round trip delay measurement in response to said interrupt signal.

22. An article of manufacture comprising a computer-readable medium having stored therein instructions which, when executed, cause a first processor-based system to perform the method of:
selecting a timing primitive signal value;
storing the selected timing primitive signal value in a first register;
sending said selected timing primitive signal value to a second processor-based system;
transmitting a timing primitive signal having the selected value from said first processor-based system to said second processor-based system;
starting a timer when the timing primitive signal having the selected value is transmitted by said first processor-based system; and,
computing the time elapsed from transmitting the timing primitive signal having the selected value to receiving the timing primitive signal from said second processor-based system.

23. An article of manufacture as recited in claim 22 further comprising stored instructions which, when executed, cause said first processor-based system to perform the additional method steps of:

receiving a timing primitive signal value from said second processor-based system;

storing said timing primitive signal value in a second register; and, enabling, in response to a command received from said second processor-based system, the retransmission of said received timing primitive signal if the value of said received timing primitive signal has the same value as the timing primitive signal value stored in said second register.

24. An article of manufacture as recited in claim 23 further comprising stored instructions that enable said first processor-based system to read a received primitive signal value stored in a third register if the value of the received primitive signal differs from that in said first register and said second register.

25. An article of manufacture comprising a computer-readable medium having stored therein instructions which, when executed, cause a first processor-based system to perform the method of:

storing a timing primitive signal value received from a second processor-based system in a register; and, enabling, in response to a command from said second processor-based system, the transmission of a received timing primitive signal to said second processor-based system if the value of said received timing primitive signal has the same value as that stored in said register.

26. A processor-based system comprising:

a processor; and, a computer-readable medium coupled to said processor and storing instructions which, when executed, cause said processor to perform the method of:

selecting a timing primitive signal value;

storing the selected timing primitive signal value in a first register;

sending the selected timing primitive signal value to a second processor-based system;

transmitting a timing primitive signal having the selected value from said first processor-based system to said second processor-based system;

starting a timer when said timing primitive signal is transmitted by said first processor-based system; and, computing the time elapsed from transmitting the timing primitive signal to receiving said timing primitive signal from said second processor-based system.

27. A processor-based system as recited in claim 26 further comprising stored instructions which, when executed, cause the processor to perform the steps of:

receiving a timing signal primitive value from said second processor-based system;

storing said timing primitive signal value received from said second processor-based system in a second register; and, enabling, in response to a command received from said second processor-based system, the retransmission of said received timing primitive signal if said received timing primitive signal has the same value as the value stored in said second register.

28. A processor-based system as recited in claim 27 further comprising stored instructions which, when executed, cause said first processor-based system to perform the additional step of:

reading a received primitive signal value stored in a third register if the value of the received primitive signal differs from the value stored in said first register and said second register.

29. A processor-based system comprising:

a processor; and, a computer-readable medium coupled to said processor and storing instructions which, when executed, cause said processor to perform the steps of:

storing a timing primitive signal value received from a second processor-based system in a register; and, enabling, in response to a command from said second processor-based system, the transmission of a received timing primitive signal to said second processor-based system if said received timing primitive signal has the same value as the value stored in said register.

30. A Fibre Channel fabric comprising:

a first Fibre Channel switch;

a second Fibre Channel switch;

a link connecting said first and second switches;

a receiver in said first Fibre Channel switch for receiving timing primitive signals from said second Fibre Channel switch;

a first register in said first Fibre Channel switch for storing a timing primitive signal value to be received from said second Fibre Channel switch, a timing primitive signal value being at least a portion of a frame payload of a frame provided by said second Fibre Channel switch; and, logic circuitry in said first Fibre Channel switch for comparing the value of a timing primitive signal received from said second Fibre Channel switch to the timing primitive signal value stored in said first register for storing timing primitive signals.

31. A Fibre Channel fabric as recited in claim 30 further comprising a transmitter in said first Fibre Channel switch for transmitting a timing primitive signal received from said second Fibre Channel switch, when the timing primitive signal has the same value as the timing primitive signal value stored in said first register.

32. A Fibre Channel fabric comprising:

a first Fibre Channel switch;

a second Fibre Channel switch;

a link connecting said first and second Fibre Channel switches, wherein said first Fibre Channel switch includes:

a receiver for receiving timing primitive signals from said second Fibre Channel switch;

a first register for storing timing primitive signal values received from said second Fibre Channel switch;

logic circuitry for comparing the value of a timing primitive signal received from said second Fibre Channel switch to a timing signal value stored in said first register for storing timing primitive signal values; and, a transmitter for transmitting a timing primitive signal received from said second Fibre Channel switch, when the value of said timing primitive signal is the same as the timing primitive signal value stored in said first register, and wherein said second Fibre Channel switch includes:

a transmitter for sending a timing primitive signal value to said first Fibre Channel switch for storage in said first register;

a second register for storing the timing primitive signal value;

a transmitter for transmitting a timing primitive signal to said first Fibre Channel switch;

a timer which starts when said transmitter transmits the timing primitive signal and which can be stopped;

a receiver for receiving timing primitive signals from said first Fibre Channel switch; and, a comparator coupled to said receiver of said second Fibre Channel switch and said timer for stopping said timer if a received timing primitive signal has the same value as the timing primitive signal value stored in said second register.

33. A network comprising:
a first end node coupled to a first Fibre Channel switch;
a second end node coupled to a second Fibre Channel switch;
a link connecting said first and second Fibre Channel switches;
a receiver in said first Fibre Channel switch for receiving timing primitive signal values from said second Fibre Channel switch;
a first register in said first Fibre Channel switch for storing a timing primitive signal value to be received from said second Fibre Channel switch, a timing primitive signal value being at least a portion of a frame payload of a frame provided by said second Fibre Channel switch; and,
logic circuitry in said first Fibre Channel switch for comparing the value of a timing primitive signal received from said second Fibre Channel switch to the timing primitive signal value stored in said first register for storing timing primitive signal values.

34. A network as recited in claim 33 further comprising a transmitter in said first Fibre Channel switch for transmitting a timing primitive signal received from said second Fibre Channel switch, when the timing primitive signal has the same value as the timing primitive signal value stored in said first register.

35. A network as recited in claim 33 further comprising a transmitter in said second Fibre Channel switch for sending a timing primitive signal value to said first Fibre Channel switch.

36. A network comprising:
a first end node;
a first Fibre Channel switch coupled to said first end node;
a second end node;
a second Fibre Channel switch coupled to said second end node; and,
a link connecting said first and second Fibre Channel switches;
wherein said first Fibre Channel switch includes:
a receiver for receiving timing primitive signals from said second Fibre Channel switch;
a first register for storing timing primitive signal values received from said second Fibre Channel switch;
logic circuitry for comparing the value of a timing primitive signal received from said second Fibre Channel switch to a timing primitive signal value stored in said first register for storing timing primitive signal values; and,
a transmitter for transmitting a timing primitive signal received from said second Fibre Channel switch, when the value of the timing primitive signal is the same as the timing primitive signal value stored in said first register, and
wherein said second Fibre Channel switch includes:
a transmitter for sending a timing primitive signal value to said first Fibre Channel switch for storage in said first register;
a second register for storing the timing primitive signal value;
a transmitter for transmitting the timing primitive signal to said first Fibre Channel switch;
a timer which starts when said transmitter transmits the timing primitive signal and which can be stopped;
a receiver for receiving timing primitive signals from said first Fibre Channel switch; and,
a comparator coupled to said receiver of said second Fibre Channel switch and said timer for stopping said timer if the value of a received timing primitive signal is the same as the timing primitive signal value stored in said second register.

37. A network as recited in claim 36 wherein said first Fibre Channel switch further includes a third register for storing a received timing primitive signal value which is not the same as the timing primitive signal value in said first register.

* * * * *